United States Patent
Kobayashi

(10) Patent No.: US 8,867,903 B2
(45) Date of Patent: Oct. 21, 2014

(54) IMAGE PROCESSING APPARATUS AND IMAGE PROCESSING METHOD

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 13/143,582

(22) PCT Filed: Jan. 26, 2010

(86) PCT No.: PCT/JP2010/051310
§ 371 (c)(1),
(2), (4) Date: Jul. 7, 2011

(87) PCT Pub. No.: WO2010/100985
PCT Pub. Date: Sep. 10, 2010

(65) Prior Publication Data
US 2011/0274412 A1 Nov. 10, 2011

(30) Foreign Application Priority Data

Mar. 6, 2009 (JP) ................. 2009-054064

(51) Int. Cl.
*G11B 27/34* (2006.01)
*G06T 5/00* (2006.01)
*G06T 5/20* (2006.01)
*H04N 5/21* (2006.01)
*H04N 101/00* (2006.01)

(52) U.S. Cl.
CPC ............. *H04N 5/21* (2013.01); *H04N 2101/00* (2013.01); *G06T 5/002* (2013.01); *G06T 5/20* (2013.01); *G06T 2207/10016* (2013.01); *G06T 2207/20201* (2013.01); *G06T 5/003* (2013.01)
USPC ........................................................ 386/280

(58) Field of Classification Search
USPC ............................................ 386/280; 348/625
See application file for complete search history.

(56) References Cited

U.S. PATENT DOCUMENTS 7,221,778 B2    5/2007    Kondo et al.
7,417,668 B2 *   8/2008    Sasagawa .................. 348/220.1

(Continued)

FOREIGN PATENT DOCUMENTS

JP      2003-006648 A    1/2003
JP      2004-126591 A    4/2004

(Continued)

OTHER PUBLICATIONS

R. Raskar, et al., "Coded Exposure Photography: Motion Deblurring using Fluttered Shutter", ACM SIGGRAPH, pp. 1-12, 2006.

*Primary Examiner* — Dave Czekaj
*Assistant Examiner* — Shanika Brumfield
(74) *Attorney, Agent, or Firm* — Fitzpatrick, Cella, Harper & Scinto

(57) ABSTRACT

This invention provides a technique for displaying a suitable image even when displaying, as a movie display image or still image display image, a frame image which forms a movie. When it is represented to display a frame image as a movie display image, a multiple outline removal unit updates the frame image by blurring an outline in the frame image. An image output unit outputs the updated frame image as a movie display image. When it is represented to display a frame image as a still image display image, a motion blur removal unit updates the frame image by removing a motion blur from the frame image. The image output unit outputs the updated frame image as a still image display image.

9 Claims, 8 Drawing Sheets

(56) References Cited

U.S. PATENT DOCUMENTS

| | | |
|---|---|---|
| 7,542,619 B2 | 6/2009 | Toyooka et al. |
| 7,675,483 B2 | 3/2010 | Okuzawa |
| 7,844,128 B2 | 11/2010 | Toyooka et al. |
| 7,978,164 B2 * | 7/2011 | Kawashima et al. ............ 345/89 |
| 8,023,000 B2 * | 9/2011 | Tamaru ...................... 348/222.1 |
| 8,319,898 B2 * | 11/2012 | Ueno et al. .................... 348/625 |
| 2004/0080517 A1 | 4/2004 | Song et al. |
| 2009/0207259 A1 | 8/2009 | Ito et al. |

FOREIGN PATENT DOCUMENTS

| | | |
|---|---|---|
| JP | 2005-192190 A | 7/2005 |
| JP | 2006-259689 A | 9/2006 |
| JP | 2007-274299 A | 10/2007 |

* cited by examiner

| 0 | 1 | 0 |
|---|---|---|
| 1 | −4 | 1 |
| 0 | 1 | 0 |

| 1 | 1 | 1 |
|---|---|---|
| 1 | 1 | 1 |
| 1 | 1 | 1 | ably.
IMAGE PROCESSING APPARATUS AND IMAGE PROCESSING METHOD

TECHNICAL FIELD

The present invention relates to an image display technique.

BACKGROUND ART

There is a growing demand for extracting a print frame image (still image) from a movie formed from a plurality of frame images and using it as a still image. However, a movie recorded with a high-speed shutter is jerky. Even when one image (frame image) is extracted from a movie recorded with a low-speed shutter, the frame image suffers a motion blur. It is difficult to remove a motion blur by filtering.

According to Coded Exposure Photography: Motion Deblurring using Fluttered Shutter by Ramesh Raskar, ACM SIGGRAPH 2006, the shutter is opened/closed in accordance with a predetermined pattern (intermittent pattern). A motion blur in intermittently captured images can be removed using the intermittent pattern and motion information (direction and speed of a motion).

The intermittent pattern will be supplementally explained. The photographing time of one image by a video camera is 1/60 sec. In intermittent photographing using the intermittent pattern, the shutter is not kept open for 1/60 sec. Instead, the time of 1/60 sec is divided, for example, into 1,000, and photographing is done by opening and closing the shutter for every divided short time. In this case, defining a state in which the shutter is open as 1 and a state in which it is closed as 0, the intermittent pattern can be expressed by a binary number of 1,000 digits.

Generally when an object in motion is photographed not intermittently but at a low shutter speed at which a motion blur occurs, an image with a motion blur region containing various spatial frequencies is captured. Various spatial frequencies contained in the motion blur region of the image make it difficult to uniquely determine a PSF (Point Spread Function) expressing a blur pattern. It is therefore difficult to remove a motion blur using the inverse filter of the PSF. However, intermittent image photographing can limit specific spatial frequencies in the motion blur region of an image. Coded Exposure Photography: Motion Deblurring using Fluttered Shutter by Ramesh Raskar, ACM SIGGRAPH 2006 describes a method of generating an intermittent pattern which limits spatial frequencies to uniquely determine the PSF. This reference also explains a technique of removing a motion blur using the inverse filter of an estimated PSF.

However, specific spatial frequencies are limited in the motion blur region of intermittently photographing images. This results in multiple outlines of a moving object, which is visually unnatural and is not suited to view intact.

DISCLOSURE OF INVENTION

In other words, it is difficult to record and transmit both a movie display frame image representing a natural motion and a still image display frame image essentially free from a motion blur.

The present invention has been made to overcome the conventional drawbacks, and provides a technique for displaying a suitable image even when displaying, as a movie display image or still image display image, a frame image which forms a movie.

According to the first aspect of the present invention, there is provided an image processing apparatus comprising: a unit which inputs a movie formed from a plurality of frame images; a unit which acquires an instruction representing that the frame image is to be displayed as an image in a movie or the frame image is to be displayed as a still image; a first output unit which, when the acquired instruction represents that the frame image is to be displayed as an image in a movie, blurs an outline in the frame image to update the frame image and output the updated frame image as a movie display image; and a second output unit which, when the acquired instruction represents that the frame image is to be displayed as a still image, removes a motion blur from the frame image to update the frame image and output the updated frame image as a still image display image.

According to the second aspect of the present invention, there is provided an image processing apparatus comprising: a unit which acquires a stream generated by an apparatus including an input unit which inputs a movie formed from a plurality of frame images, a blurring unit which blurs outlines in the respective frame images input by the input unit, a first encode unit which encodes the respective frame images obtained by the blurring unit, a decode unit which decodes the respective frame images encoded by the first encode unit, a unit which obtains difference images between corresponding frame images among the respective frame images decoded by the decode unit and the respective frame images input by the input unit, a second encode unit which encodes the respective difference images, and a unit which generates the stream containing an encoding result of the first encode unit and an encoding result of the second encode unit; a first decode unit which decodes the encoding result of the first encode unit contained in the stream; a second decode unit which decodes the encoding result of the second encode unit contained in the stream; a unit which acquires an instruction representing which of a motion blur-removed image and a multiple outline-removed image is to be output; a unit which, when the instruction represents output of a motion blur-removed image, composites a decoding result of the first decode unit and a decoding result of the second decode unit, and outputs a result of removing a motion blur from a composition result; and a unit which, when the instruction represents output of a multiple outline-removed image, outputs the decoding result of the first decode unit.

According to the third aspect of the present invention, there is provided an image processing method, using a computer to perform the steps of: an input step of inputting a movie formed from a plurality of frame images; a step of acquiring an instruction representing that the frame image is to be displayed as an image in a movie or the frame image is to be displayed as a still image; a first output step of, when the acquired instruction represents that the frame image is to be displayed as an image in a movie, blurring an outline in the frame image to update the frame image and output the updated frame image as a movie display image; and a second output step of, when the acquired instruction represents that the frame image is to be displayed as a still image, removing a motion blur from the frame image to update the frame image and output the updated frame image as a still image display image.

According to the fourth aspect of the present invention, there is provided an image processing method, using a computer to perform the steps of: a step of acquiring a stream generated by an apparatus including an input unit which inputs a movie formed from a plurality of frame images, a blurring unit which blurs outlines in the respective frame images input by the input unit, a first encode unit which encodes the respective frame images obtained by the blurring unit, a decode unit which decodes the respective frame images encoded by the first encode unit, a unit which obtains difference images between corresponding frame images among the respective frame images decoded by the decode unit and the respective frame images input by the input unit, a second encode unit which encodes the respective difference images, and a unit which generates the stream containing an encoding result of the first encode unit and an encoding result of the second encode unit; a first decode step of decoding the encoding result of the first encode unit contained in the stream; a second decode step of decoding the encoding result of the second encode unit contained in the stream; a step of acquiring an instruction representing which of a motion blur-removed image and a multiple outline-removed image is to be output; a step of, when the instruction represents output of a motion blur-removed image, compositing a decoding result of the first decode step and a decoding result of the second decode step, thereby outputting a result of removing a motion blur from a composition result; and a step of, when the instruction represents output of a multiple outline-removed image, outputting the decoding result of the first decode step.

With the arrangement of the present invention, a suitable image can be displayed even when displaying, as a movie display image or still image display image, a frame image which forms a movie.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

First Embodiment

The first embodiment will describe an image processing apparatus which decodes and outputs movie data (encoded data of a movie formed from a plurality of frame images) encoded in accordance with ITU-T H.264 (ISO/IEC 14496-10). The gist of the embodiment does not change if another encoding scheme is employed.

Figure 1:
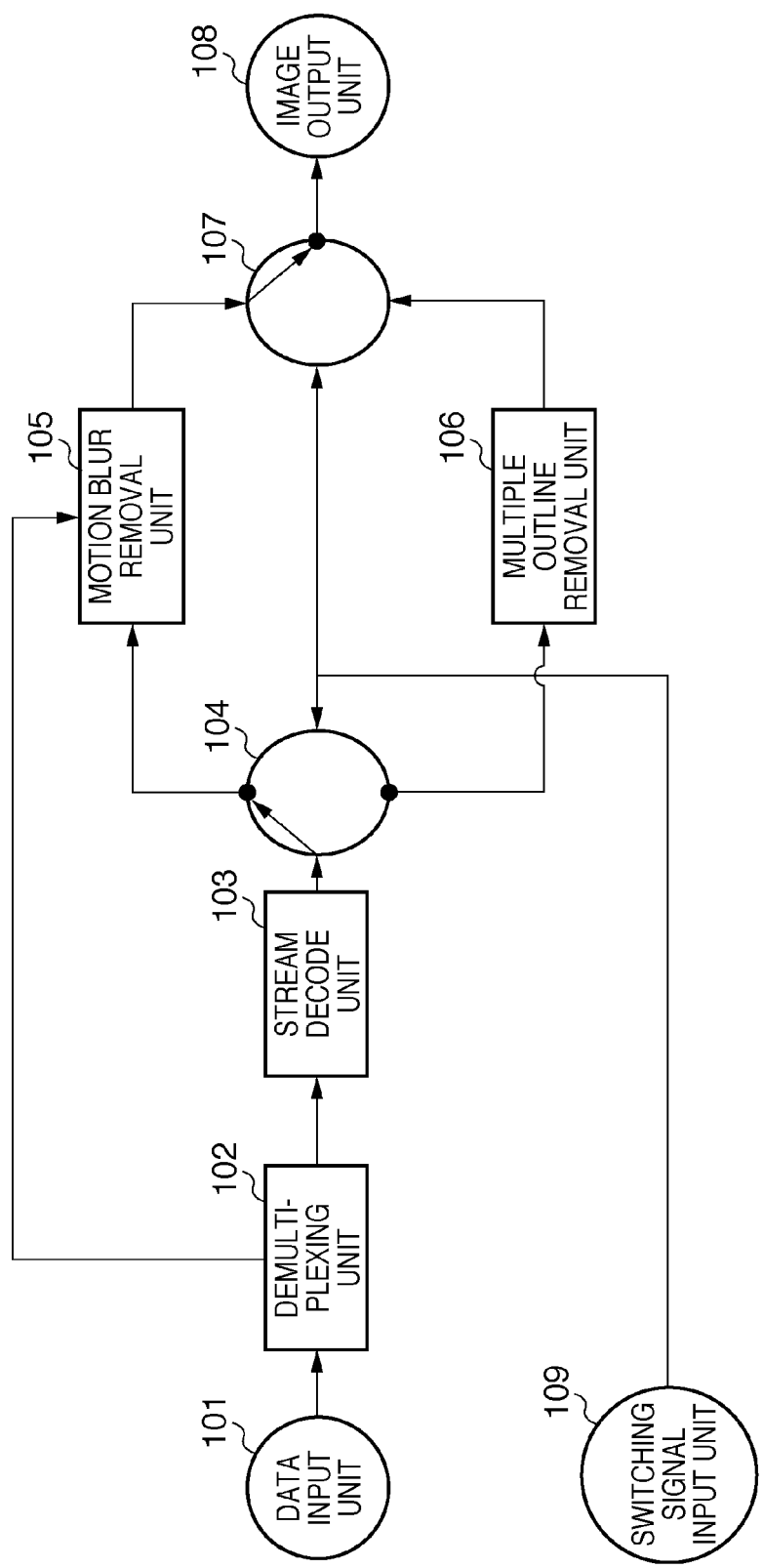
FIG. 1 is a block diagram exemplifying the functional arrangement of an image processing apparatus according to the first embodiment.

FIG. 1 is a block diagram exemplifying the functional arrangement of the image processing apparatus according to the first embodiment. As shown in FIG. 1, the image processing apparatus according to the first embodiment includes a data input unit 101, demultiplexing unit 102, stream decode unit 103, selector 104, motion blur removal unit 105, multiple outline removal unit 106, selector 107, image output unit 108, and switching signal input unit 109.

The data input unit 101 externally acquires an H.264 stream which is movie data encoded according to ITU-T H.264 (ISO/IEC 14496-10). The data input unit 101 sends the acquired H.264 stream to the subsequent demultiplexing unit 102. Note that photographing information is added (multiplexed) to the H.264 stream. The photographing information is information containing motion information measured by a gyro sensor mounted in a camera which has recoded the movie, and the above-mentioned intermittent pattern.

Upon receiving the H.264 stream multiplexed with the photographing information from the data input unit 101, the demultiplexing unit 102 demultiplexes it into the H.264 stream and photographing information. The demultiplexing unit 102 sends the H.264 stream to the subsequent stream decode unit 103 and the photographing information to the motion blur removal unit 105.

Upon receiving the H.264 stream from the demultiplexing unit 102, the stream decode unit 103 decodes the images (frame images) of respective frames contained in the H.264 stream. The stream decode unit 103 sequentially sends the decoded frame images of the respective frames to the subsequent selector 104.

The switching signal input unit 109 receives an instruction representing which of a movie display image and still image display image is to be displayed as the frame image decoded by the stream decode unit 103. Upon receiving this instruction, the switching signal input unit 109 controls the selectors 104 and 107 based on this instruction.

More specifically, when the instruction represents display of the frame image as a movie display image, the switching signal input unit 109 controls the selector 104 to input a frame image output from the stream decode unit 103 to the multiple outline removal unit 106. Also, the switching signal input unit 109 controls the selector 107 to input an output from the multiple outline removal unit 106 to the image output unit 108. That is, when the input instruction instructs to display the frame image as a movie display image, the switching signal input unit 109 controls the selectors 104 and 107 to send a frame image output from the stream decode unit 103 to the image output unit 108 via the multiple outline removal unit 106.

In contrast, when the instruction represents display of the frame image as a still image display image, the switching signal input unit 109 controls the selector 104 to input a frame image output from the stream decode unit 103 to the motion blur removal unit 105. Further, the switching signal input unit 109 controls the selector 107 to input an output from the motion blur removal unit 105 to the image output unit 108.

That is, when the input instruction instructs to display the frame image as a still image display image, the switching signal input unit 109 controls the selectors 104 and 107 to send a frame image output from the stream decode unit 103 to the image output unit 108 via the motion blur removal unit 105.

Figures 4, 5, 6:
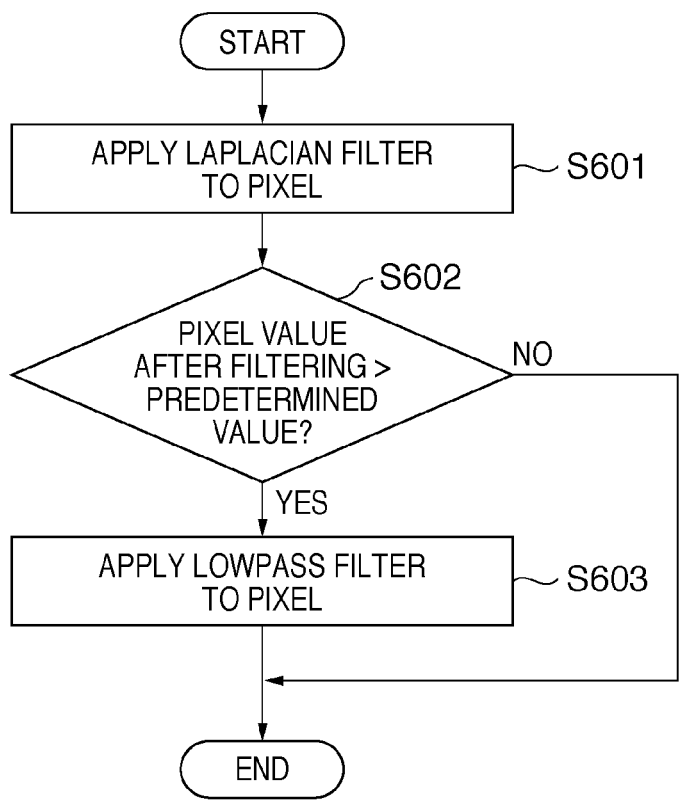
FIG. 4 is a view exemplifying the arrangement of a Laplacian filter kernel.
FIG. 5 is a view exemplifying the arrangement of a lowpass filter kernel.
FIG. 6 is a flowchart showing details of processing in step S705.

Upon receiving a frame image from the selector 104, the multiple outline removal unit 106 first detects an outline in the frame image by applying a Laplacian filter kernel having an arrangement exemplified in FIG. 4 to each pixel which forms the frame image. Then, the multiple outline removal unit 106 blurs the outline (blur processing) by applying a lowpass filter kernel having an arrangement exemplified in FIG. 5 to each pixel which forms the detected outline. Accordingly, the multiple outline removal unit 106 updates the frame image received from the selector 104 to a frame image having a blurred outline. The multiple outline removal unit 106 sends the updated frame image (frame image having a blurred outline) to the subsequent selector 107.

Upon receiving a frame image from the selector 104, the motion blur removal unit 105 updates it by removing a motion blur from the frame image by using motion information and an intermittent pattern that are contained in photographing information received from the demultiplexing unit 102. As described above, the processing of removing a motion blur from an image using motion information and an intermittent pattern is a well-known technique, and a description thereof will be omitted.

The first embodiment assumes that motion information is contained in advance in photographing information and multiplexed in an H.264 stream. However, the motion information can be dynamically obtained by calculating a motion vector using each frame image. Thus, the motion information need not always be contained in advance in photographing information. The motion blur removal unit 105 sends the updated frame image (motion blur-removed frame image) to the subsequent selector 107.

The selector 107 transfers, to the image output unit 108, an output (frame image) selected by the switching signal input unit 109 from those from the motion blur removal unit 105 and multiple outline removal unit 106.

The image output unit 108 outputs the frame image received from the selector 107. The output destination is not particularly limited, and may be a display device formed from a CRT or liquid crystal display, or a storage device.

Figure 7:
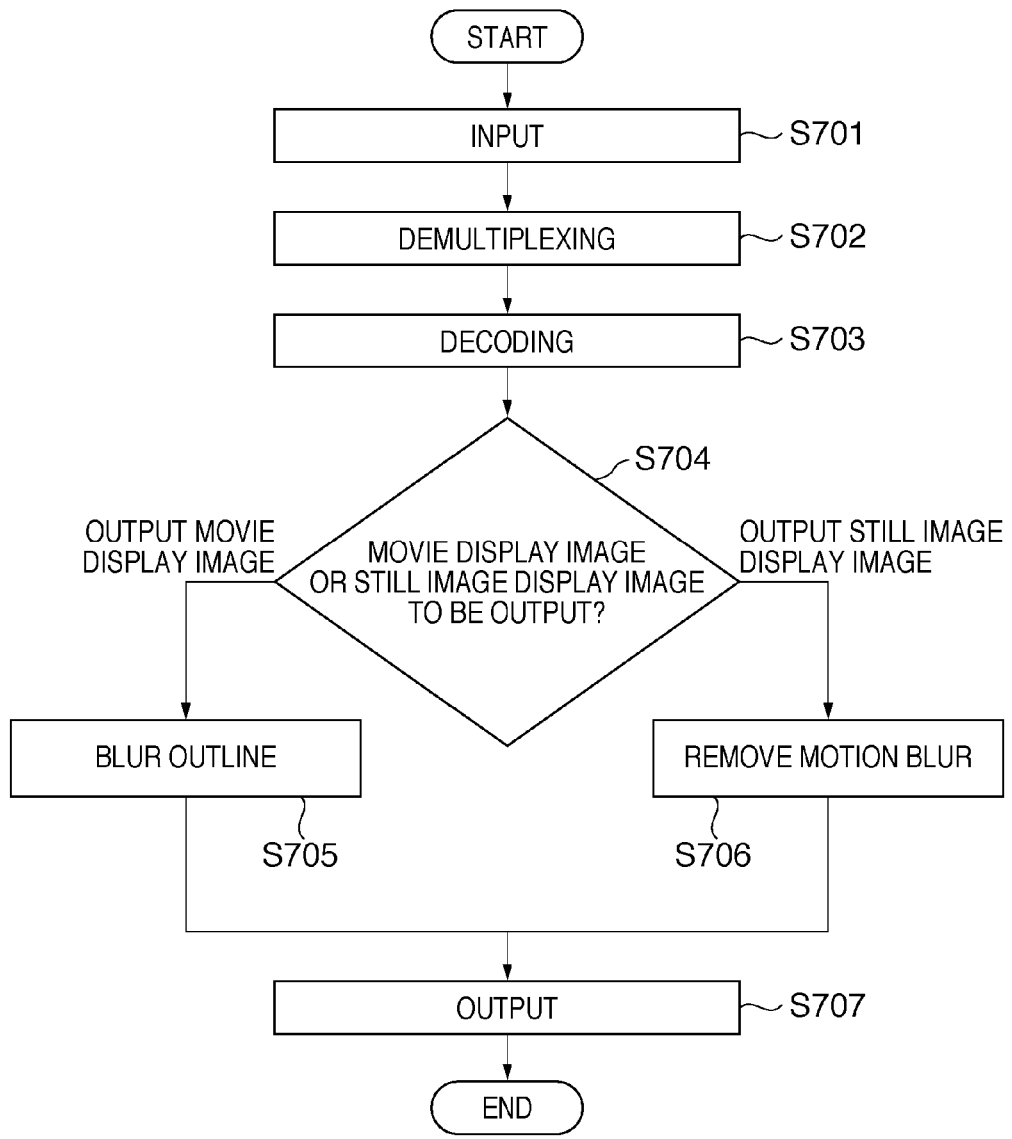
FIG. 7 is a flowchart of processing performed by the image processing apparatus according to the first embodiment.

FIG. 7 is a flowchart of processing performed by the image processing apparatus according to the first embodiment. In step S701, the data input unit 101 acquires an H.264 stream multiplexed with photographing information.

In step S702, the demultiplexing unit 102 receives the H.264 stream multiplexed with photographing information from the data input unit 101, and demultiplexes it into the H.264 stream and photographing information. The demultiplexing unit 102 sends the H.264 stream to the subsequent stream decode unit 103 and the photographing information to the subsequent motion blur removal unit 105.

In step S703, upon receiving the H.264 stream from the demultiplexing unit 102, the stream decode unit 103 decodes the images (frame images) of respective frames contained in the H.264 stream. The stream decode unit 103 sequentially sends the decoded frame images of the respective frames to the subsequent selector 104.

If the foregoing instruction instructs to display the frame image as a movie display image, the switching signal input unit 109 controls the selector 104 to input a frame image output from the stream decode unit 103 to the multiple outline removal unit 106. Also, the switching signal input unit 109 controls the selector 107 to input an output from the multiple outline removal unit 106 to the image output unit 108. In this case, the process advances to step S705 via step S704.

If the instruction instructs to display the frame image as a still image display image, the switching signal input unit 109 controls the selector 104 to input a frame image output from the stream decode unit 103 to the motion blur removal unit 105. In addition, the switching signal input unit 109 controls the selector 107 to input an output from the motion blur removal unit 105 to the image output unit 108. In this case, the process advances to step S706 via step S704.

In step S705, upon receiving a frame image from the selector 104, the multiple outline removal unit 106 first detects an outline in the frame image by applying a Laplacian filter kernel having the arrangement exemplified in FIG. 4 to each pixel which forms the frame image. Then, the multiple outline removal unit 106 blurs the outline by applying a lowpass filter kernel having the arrangement exemplified in FIG. 5 to each pixel which forms the detected outline. In this way, the multiple outline removal unit 106 updates the frame image received from the selector 104 to a frame image having a blurred outline.

FIG. 6 is a flowchart showing details of the processing in step S705. In step S601, the multiple outline removal unit 106 detects an outline in a frame image input from the selector 104 by applying a Laplacian filter kernel having the arrangement exemplified in FIG. 4 to each pixel which forms the frame image. If a pixel having a pixel value larger than a predetermined value exists in pixels to which the Laplacian filter kernel has been applied, the outline removal unit 106 advances the process to step S603 via step S602. In step S603, the multiple outline removal unit 106 blurs the outline by applying a lowpass filter kernel having the arrangement exemplified in FIG. 5 to the pixel. The multiple outline removal unit 106 sends the updated frame image (frame image having a blurred outline) to the subsequent selector 107.

In step S706, upon receiving a frame image from the selector 104, the motion blur removal unit 105 updates it by removing a motion blur from the frame image by using motion information and an intermittent pattern that are contained in the photographing information received from the demultiplexing unit 102. The motion blur removal unit 105 sends the updated frame image (motion blur-removed frame image) to the subsequent selector 107.

In step S707, the selector 107 transfers, to the image output unit 108, an output (frame image) selected by the switching signal input unit 109 from those from the motion blur removal unit 105 and multiple outline removal unit 106. The image output unit 108 outputs the frame image received from the selector 107 (first output and second output). The processes in step S704 and subsequent steps are executed from each frame image.

As described above, according to the first embodiment, a movie display image with a natural motion and a still image display image free from a motion blur can be appropriately switched and output in accordance with an external request.

In the first embodiment, each frame is processed. However, the present invention is not limited to this, and each pixel or each block may be processed. The multiple outline removal unit 106 detects an outline and applies a lowpass filter to it. However, the detection method and filter kernel are not limited to the foregoing examples.

In FIG. 1, data are directly exchanged between the respective units for descriptive convenience. Alternatively, data to be exchanged may be temporarily stored in a memory to transfer the stored data to the next transfer destination. This arrangement may be adopted for any purpose.

Second Embodiment

Figure 2:
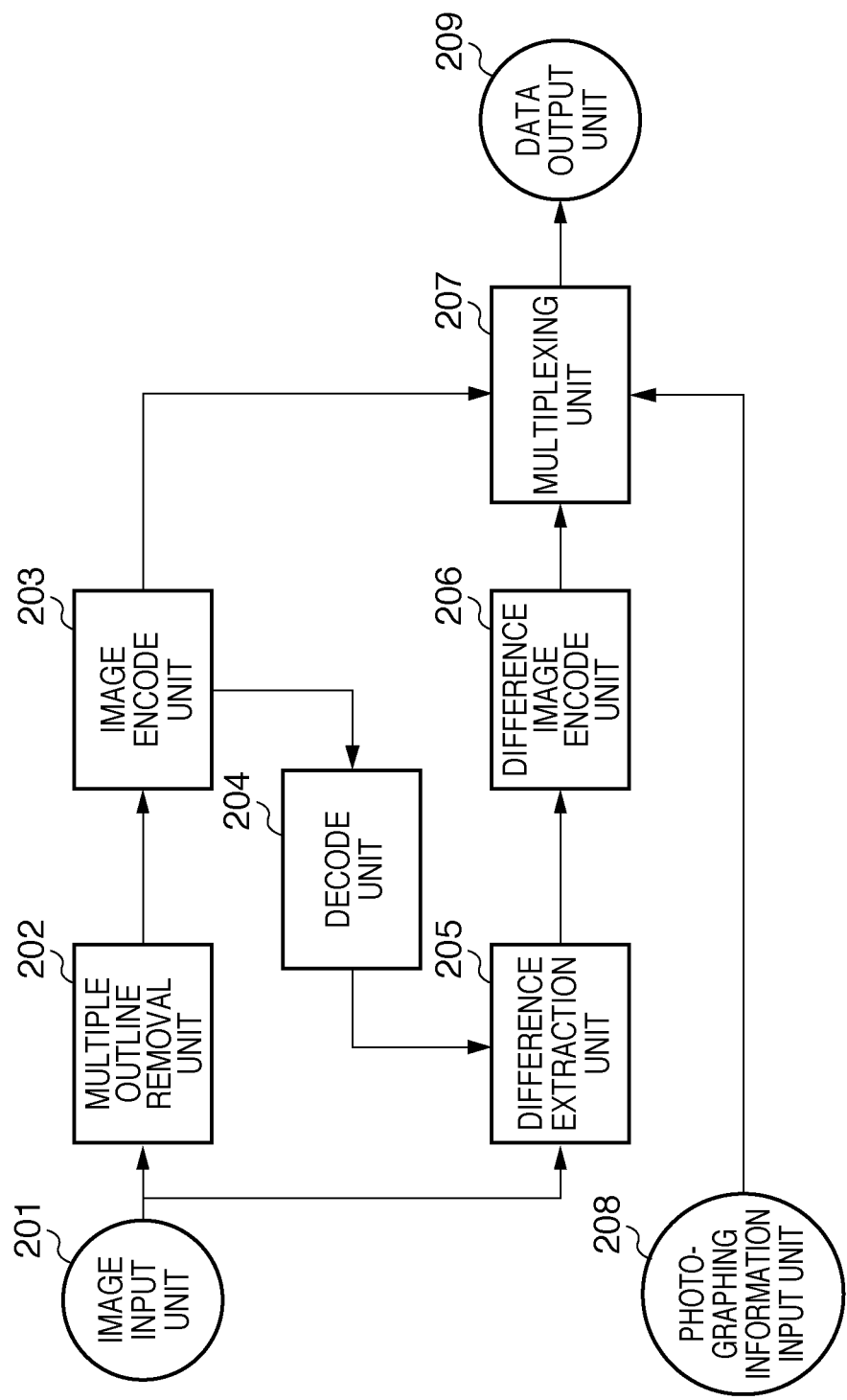
FIG. 2 is a block diagram exemplifying the functional arrangement of an encoding apparatus serving as an image processing apparatus according to the second embodiment.

FIG. 2 is a block diagram exemplifying the functional arrangement of an encoding apparatus serving as an image processing apparatus according to the second embodiment. As shown in FIG. 2, the encoding apparatus includes an image input unit 201, multiple outline removal unit 202, image encode unit 203, decode unit 204, difference extraction unit 205, difference image encode unit 206, multiplexing unit 207, photographing information input unit 208, and data output unit 209.

The image input unit 201 sequentially receives frame images (intermittently photographed images) photographed intermittently by opening/closing a shutter in accordance with a predetermined intermittent pattern. The image input unit 201 sends the externally input frame images to the multiple outline removal unit 202 and difference extraction unit 205.

The multiple outline removal unit 202 is identical to the multiple outline removal unit 106 described in the first embodiment. The multiple outline removal unit 202 updates the input frame image by blurring an outline in the frame image. The multiple outline removal unit 202 outputs the updated frame image to the subsequent image encode unit 203.

According to the H.264 encoding scheme, the image encode unit 203 encodes the frame image input from the multiple outline removal unit 202 (first encoding). The image encode unit 203 outputs the encoded frame image (encoding result) to the subsequent multiplexing unit 207. The image encode unit 203 outputs encoded intermediate information such as quantized DCT encoded information to the decode unit 204.

The decode unit 204 decodes the encoded intermediate information received from the image encode unit 203, generating a decoded frame image. The decode unit 204 sends the decoded image generated in this manner to the difference extraction unit 205.

The difference extraction unit 205 sequentially receives frame images from the image input unit 201 and decoded images from the decode unit 204. The difference extraction unit 205 extracts a difference image between corresponding frame images among frame images input from the image input unit 201 and decoded frame images input from the decode unit 204. The difference extraction unit 205 sends the extracted difference image to the subsequent difference image encode unit 206. The difference image encode unit 206 JPEG-compresses sequentially input difference images (second encoding).

The photographing information input unit 208 receives photographing information described in the first embodiment. The photographing information input unit 208 sends the received photographing information to the subsequent multiplexing unit 207.

The multiplexing unit 207 multiplexes the photographing information input from the photographing information input unit 208, the encoding result (difference stream) sent from the difference image encode unit 206, and the encoding result (main stream) sent from the image encode unit 203. The multiplexing unit 207 sends the multiplexing result as a stream to the data output unit 209.

The data output unit 209 outputs the stream received from the multiplexing unit 207. The output destination is not particularly limited. The stream may be output to a storage device such as a hard disk, or directly to a decoding apparatus having an arrangement shown in FIG. 3.

Figure 8:
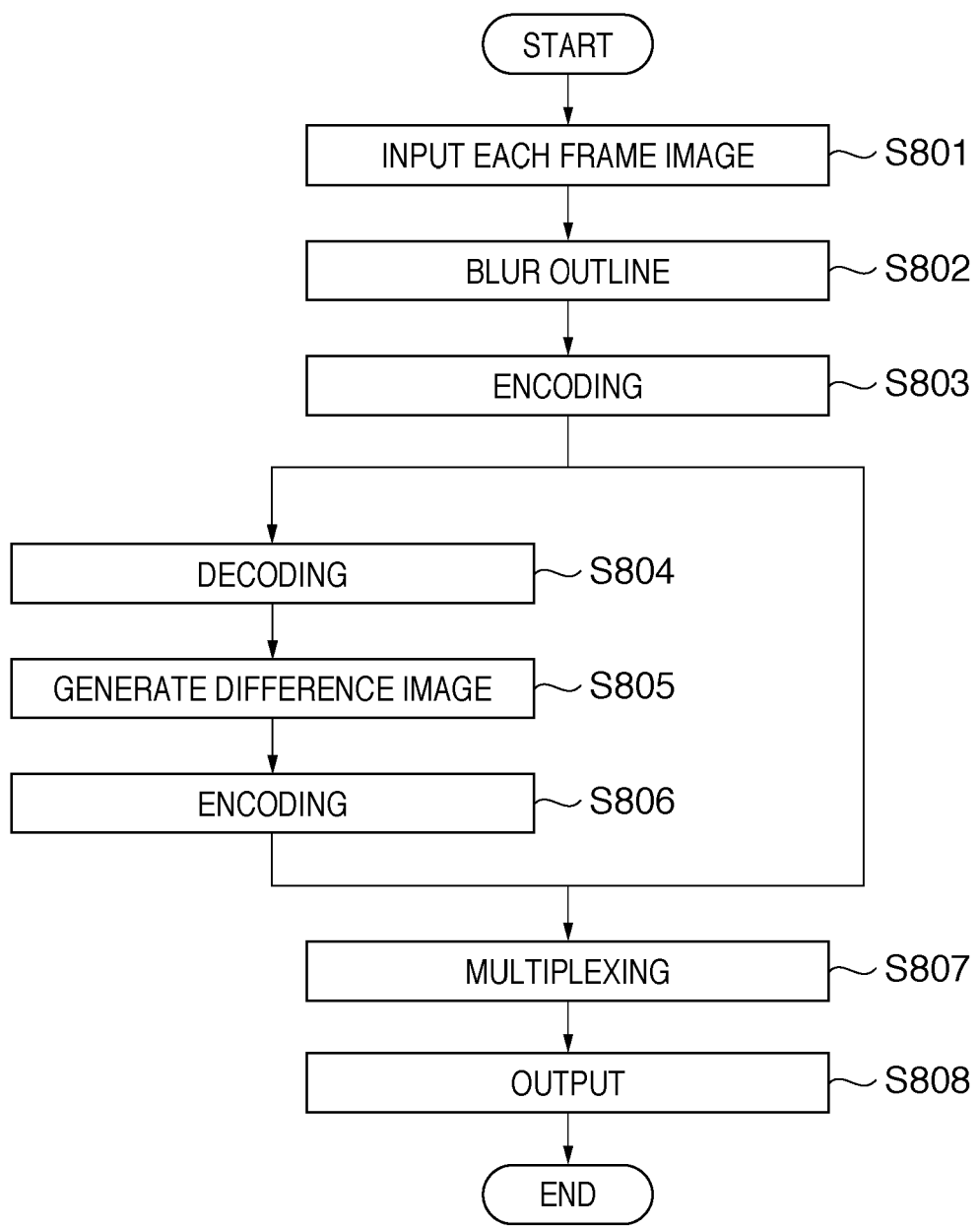
FIG. 8 is a flowchart of processing performed by the encoding apparatus serving as an image processing apparatus according to the second embodiment.

FIG. 8 is a flowchart of processing performed by the encoding apparatus serving as an image processing apparatus according to the second embodiment. In step S801, the image input unit 201 sequentially receives frame images (intermittently photographed images). The image input unit 201 sends the frame images to the multiple outline removal unit 202 and difference extraction unit 205.

In step S802, the multiple outline removal unit 202 updates an input frame image by blurring an outline in the frame image. The multiple outline removal unit 202 outputs the updated frame image to the subsequent image encode unit 203.

In step S803, the image encode unit 203 encodes the frame image input from the multiple outline removal unit 202 according to the H.264 encoding scheme (first encoding). The image encode unit 203 outputs the encoded frame image (encoding result) to the subsequent multiplexing unit 207. Further, the image encode unit 203 outputs encoded intermediate information such as quantized DCT encoded information to the decode unit 204.

In step S804, the decode unit 204 decodes the encoded intermediate information received from the image encode unit 203, generating a decoded frame image. The decode unit 204 sends the decoded image generated in this fashion to the difference extraction unit 205.

In step S805, the difference extraction unit 205 extracts a difference image between corresponding frame images among frame images input from the image input unit 201 and decoded frame images input from the decode unit 204. The difference extraction unit 205 sends the extracted difference image to the subsequent difference image encode unit 206. In step S806, the difference image encode unit 206 JPEG-compresses sequentially input difference images (second encoding).

In step S807, the multiplexing unit 207 multiplexes the photographing information input from the photographing information input unit 208, the encoding result (difference stream) sent from the difference image encode unit 206, and the encoding result (main stream) sent from the image encode unit 203. The multiplexing unit 207 sends the multiplexing result as a stream to the data output unit 209. In step S808, the data output unit 209 outputs the stream received from the multiplexing unit 207.

Figure 3:
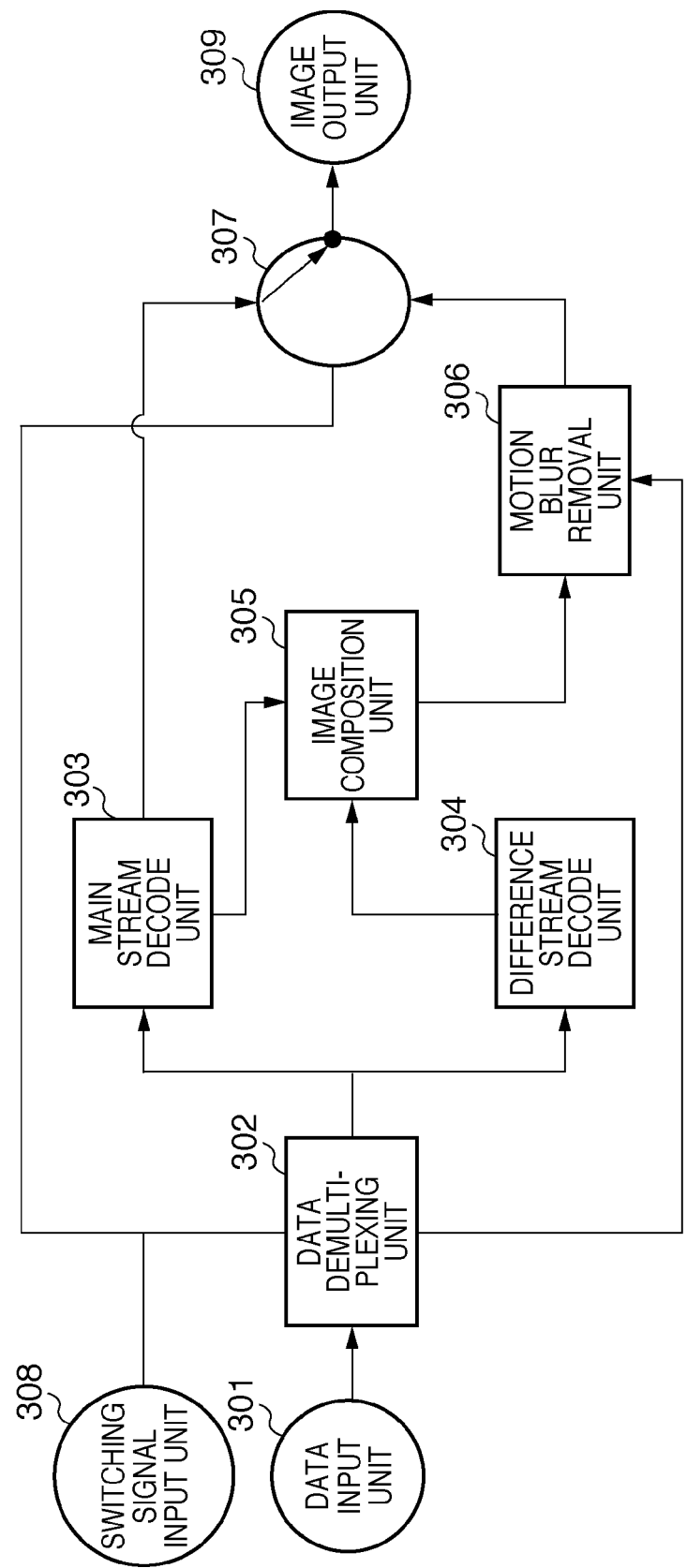
FIG. 3 is a block diagram exemplifying the functional arrangement of a decoding apparatus serving as an image processing apparatus according to the second embodiment.

FIG. 3 is a block diagram exemplifying the functional arrangement of a decoding apparatus serving as an image processing apparatus according to the second embodiment. As shown in FIG. 3, the decoding apparatus includes a switching signal input unit 308, data input unit 301, data demultiplexing unit 302, main stream decode unit 303, difference stream decode unit 304, image composition unit 305, motion blur removal unit 306, selector 307, and image output unit 309.

The data input unit 301 receives a stream generated by the encoding apparatus having the arrangement shown in FIG. 2. The data input unit 301 sends the stream to the subsequent data demultiplexing unit 302.

The data demultiplexing unit 302 sends a main stream contained in the stream to the main stream decode unit 303 and a difference stream to the difference stream decode unit 304. The data demultiplexing unit 302 sends photographing information contained in the stream to the motion blur removal unit 306. The main stream decode unit 303 decodes the main stream (first decoding). The difference stream decode unit 304 decodes the difference stream (second decoding).

The switching signal input unit 308 receives an instruction representing which of a motion blur-removed image and multiple outline-removed image is to be output. When the instruction instructs to output a motion blur-removed image, the switching signal input unit 308 controls the main stream decode unit 303 and difference stream decode unit 304 to set the image composition unit 305 as their output destination. The image composition unit 305 receives the decoding results of the main and difference streams.

The image composition unit 305 composites the decoding results of the main and difference streams. More specifically, the image composition unit 305 generates, for each frame, an image (decoded multiple outline image) obtained by compositing the decoded frame image and decoded difference image. The image composition unit 305 sends the decoded multiple outline image to the motion blur removal unit 306.

The motion blur removal unit 306 is identical to the motion blur removal unit 105 shown in FIG. 1. The motion blur removal unit 306 updates the decoded multiple outline image by removing a motion blur from the decoded multiple outline image by using the photographing information received from the data demultiplexing unit 302. The motion blur removal unit 306 sends the updated decoded multiple outline image to the selector 307. In this case, the selector 307 sends the updated multiple outline-removed image to the subsequent image output unit 309.

To the contrary, when the instruction instructs to output a multiple outline-removed image, the switching signal input unit 308 controls the main stream decode unit 303 to set the selector 307 as the output destination. In this case, the selector 307 sends the frame image decoded by the main stream decode unit 303 to the subsequent image output unit 309.

The image output unit 309 outputs an image received from the selector 307. The output destination is not particularly limited, similar to the first embodiment.

Figure 9:
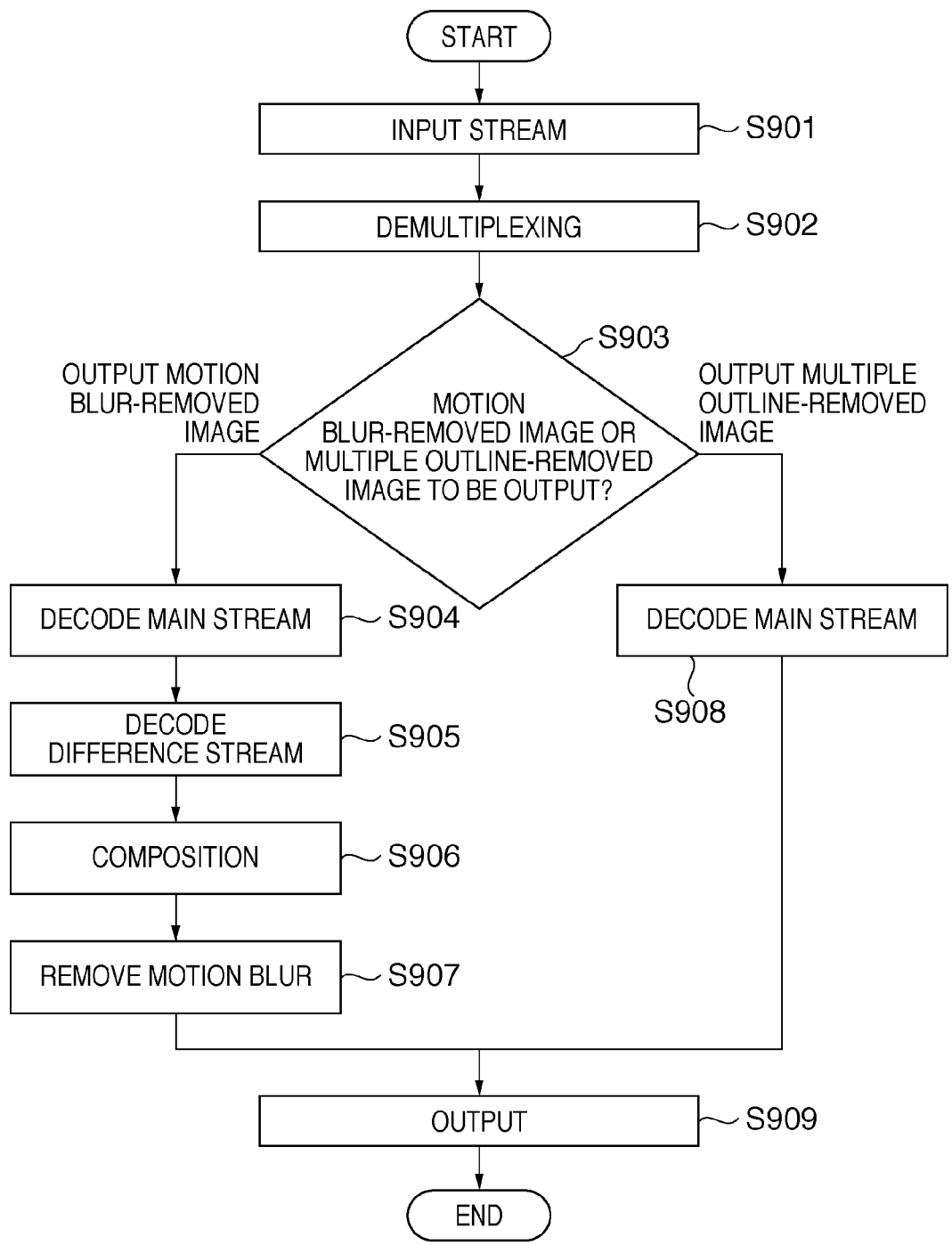
FIG. 9 is a flowchart of processing performed by the decoding apparatus serving as an image processing apparatus according to the second embodiment.

FIG. 9 is a flowchart of processing performed by the decoding apparatus serving as an image processing apparatus according to the second embodiment. In step S901, the data input unit 301 acquires a stream and sends it to the subsequent data demultiplexing unit 302.

In step S902, the data demultiplexing unit 302 sends a main stream contained in the stream to the main stream decode unit 303 and a difference stream to the difference stream decode unit 304. The data demultiplexing unit 302 sends photographing information contained in the stream to the motion blur removal unit 306.

If an input instruction instructs to output a motion blur-removed image, the switching signal input unit 308 controls the main stream decode unit 303 and difference stream decode unit 304 to set the image composition unit 305 as their output destination. In this case, the process advances to step S904 via step S903.

In step S904, the main stream decode unit 303 decodes the main stream. In step S905, the difference stream decode unit 304 decodes the difference stream.

In step S906, the image composition unit 305 composites the decoding results of the main and difference streams. More specifically, the image composition unit 305 generates, for each frame, an image (decoded multiple outline image) obtained by compositing the decoded frame image and decoded difference image. The image composition unit 305 sends the decoded multiple outline image to the motion blur removal unit 306.

In step S907, the motion blur removal unit 306 updates the decoded multiple outline image by removing a motion blur from the decoded multiple outline image by using the photographing information received from the data demultiplexing unit 302. The motion blur removal unit 306 sends the updated decoded multiple outline image to the selector 307. In this case, the selector 307 sends the updated multiple outline-removed image to the subsequent image output unit 309.

If the instruction instructs to output a multiple outline-removed image, the switching signal input unit 308 controls the main stream decode unit 303 to set the selector 307 as the output destination. In this case, the process advances to step S908 via step S903.

In step S908, the main stream decode unit 303 decodes the main stream. In this case, the selector 307 sends the frame image decoded by the main stream decode unit 303 to the subsequent image output unit 309. In step S909, the image output unit 309 outputs an image received from the selector 307.

The second embodiment assumes that motion information is contained in advance in photographing information. However, the motion information can be dynamically attained by obtaining a motion vector using each frame image. Thus, the motion information need not always be contained in advance in photographing information.

The second embodiment adopts H.264 as a main stream encoding scheme and JPEG as a difference stream encoding scheme, but the present invention is not limited to them. In the second embodiment, each frame is processed. However, the present invention is not limited to this, and each pixel or each block may be processed.

In FIGS. 2 and 3, data are directly exchanged between the respective units for descriptive convenience. Alternatively, data to be exchanged may be temporarily stored in a memory to transfer the stored data to the next transfer destination. This arrangement may be adopted for any purpose.

The multiple outline removal unit 202 detects an outline and applies a lowpass filter to it. However, the detection method and filter kernel are not limited to the foregoing examples. In the second embodiment, a difference image is generated for each frame, but the present invention is not limited to this. A difference image may be generated periodically or for only an arbitrary frame such as a frame after a scene change.

In the second embodiment, a main stream, difference stream, and photographing information are associated by adding the identification code of the main stream to the difference stream and photographing information. However, the association method is not limited to this. For example, streams and information can be associated with each other by arranging them in a predetermined order and combining them as a set of streams and information for the same image.

A decoding apparatus having the arrangement shown in FIG. 3 decodes data generated by an encoding apparatus having the arrangement shown in FIG. 2. An image almost free from jerkiness and an image almost free from a motion blur can be output by switching them in accordance with an external signal.

Even when a decoding apparatus complying with general H.264 decodes data generated by an encoding apparatus having the arrangement shown in FIG. 2, it can decode an image with less jerkiness by decoding only a main stream without processing a difference stream.

A module which executes motion blur removal processing having a relatively heavy processing load is arranged in the decoding apparatus. This arrangement can minimize an increase in power consumption of an encoding apparatus incorporated in a camera which is often driven by a battery.

Third Embodiment

Figure 10:
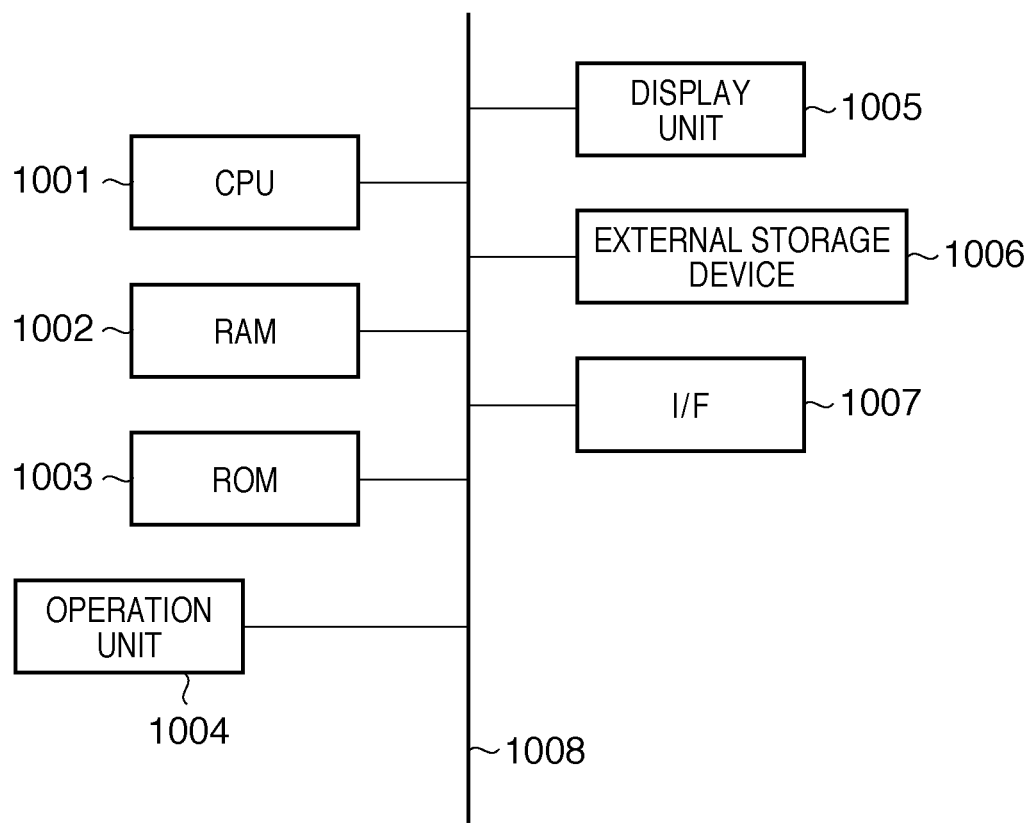
FIG. 10 is a block diagram exemplifying the hardware configuration of a computer applicable to an image processing apparatus (including encoding and decoding apparatuses) in each embodiment.

All the units shown in FIGS. 1, 2, and 3 may be formed from hardware or mounted as computer programs for implementing the functions of these units by the CPU of a computer. FIG. 10 is a block diagram exemplifying the hardware configuration of a computer applicable to an image processing apparatus (including encoding and decoding apparatuses) in each embodiment described above.

A CPU 1001 controls the whole computer using computer programs and data stored in a RAM 1002 and ROM 1003. Also, the CPU 1001 executes the processes, which are performed in the above description by an apparatus to which a computer is applied.

The RAM 1002 has an area for temporarily storing computer programs and data loaded from an external storage device 1006, data externally acquired via an I/F (interface) 1007, and the like. The RAM 1002 further has a work area used when the CPU 1001 executes various processes. That is, the RAM 1002 can properly provide a variety of areas. The ROM 1003 stores a boot program, setting data of the computer, and the like.

An operation unit 1004 includes a keyboard and mouse. By manipulating the operation unit 1004, the operator of the computer can input various instructions to the CPU 1001. For example, the operator may input the above-mentioned instruction via the operation unit 1004. A display unit 1005 is formed from a CRT, liquid crystal display, or the like and can display the result of processing by the CPU 1001 as an image or text.

The external storage device 1006 is a large-capacity information storage device typified by a hard disk drive. The external storage device 1006 saves an OS (Operating System), and computer programs and data for causing the CPU 1001 to achieve the functions of the respective units shown in FIGS. 1, 2, and 3. The external storage device 1006 may also save, e.g., movie data and photographing information to be processed. Computer programs and data saved in the external storage device 1006 are appropriately loaded to the RAM 1002 under the control of the CPU 1001 and processed by the CPU 1001.

The I/F 1007 communicates data with an external device. For example, when the computer is applied to the encoding apparatus, the I/F 1007 is used to communicate data with the decoding apparatus. A bus 1008 connects these units.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-054064, filed Mar. 6, 2009, which is hereby incorporated by reference herein in its entirety.

The invention claimed is:

1. An image processing apparatus comprising:
an acquisition unit configured to acquire movie data, wherein the movie data includes multiple-outline-removed images obtained by outline burring processing on captured images and includes difference images obtained based on differences between the captured images and the multiple-outline-removed images;
an instruction acquisition unit configured to acquire an instruction which indicates which of a motion blur-removed image and a multiple-outline-removed image is to be displayed;
a first output unit configured to output, in a case where the acquired instruction indicates that the multiple-outline-removed image is to be displayed, the multiple-outline-removed images included in the movie data; and
a second output unit configured to generate, in a case where the acquired instruction indicates that the motion blur-removed image is to be displayed, the motion blur-removed images based on the difference images and the multiple-outline-removed images and outputs the generated motion blur-removed images.

2. The apparatus according to claim 1, wherein the multiple-outline-removed image is an image obtained by detecting the outline in the captured images using a Laplacian filter kernel for each pixel which forms the captured images, and blurring the outline using a lowpass filter kernel for the detected outline.

3. The apparatus according to claim 1, wherein the second output unit generates the motion blur-removed images by compositing the difference images and the multiple-outline-removed images.

4. An image processing apparatus comprising:
a stream acquisition unit configured to acquire a stream generated by another apparatus including:
an input unit configured to input a movie formed from a plurality of frame images,
a blurring unit configured to blur outlines in the frame images input by the input unit,
a first encode unit configured to encode the frame images obtained by the blurring unit,
a decode unit configured to decode the frame images encoded by the first encode unit,
a differentiation unit configured to obtain difference images between corresponding frame images among the frame images decoded by the decode unit and the frame images input by the input unit,
a second encode unit configured to encode the difference images, and
a generation unit configured to generate the stream containing an encoding result of the first encode unit and an encoding result of the second encode unit;
a first decode unit configured to decode the encoding result of the first encode unit contained in the stream;
a second decode unit configured to decode the encoding result of the second encode unit contained in the stream;
an instruction acquisition unit configured to acquire an instruction indicating which of a motion blur-removed image and a multiple outline-removed image is to be output;
a first output unit configured to generate, in a case where the instruction indicates that the motion blur-removed image is to be output, the motion blur-removed image by compositing a decoding result of the first decode unit and a decoding result of the second decode unit, and outputs the generated motion blur-removed image; and a second output unit configured to output, in a case where the instruction indicates that the multiple outline-removed image is to be output, the decoding result of the first decode unit.

5. An image processing method, using a computer to perform:
  an acquisition step of acquiring movie data, wherein the movie data includes multiple-outline-removed images obtained by outline burring processing on captured images and includes difference images obtained based on differences between the captured images and the multiple-outline-removed images;
  an instruction acquisition step of acquiring an instruction which indicates which of a motion blur-removed image and a multiple-outline-removed image is to be displayed;
  a first output step of outputting, in a case where the acquired instruction indicates that the multiple-outline-removed image is to be displayed, the multiple-outline-removed images included in the movie data; and
  a second output step of generating, in a case where the acquired instruction indicates that the motion blur-removed image is to be displayed, the motion blur-removed images based on the difference images and the multiple-outline-removed images and outputting the generated motion blur-removed images.

6. An image processing method, using a computer to perform:
  a step of acquiring a stream generated by an apparatus including:
    an input unit configured to input a movie formed from a plurality of frame images,
    a blurring unit configured to blur outlines in the frame images input by the input unit,
    a first encode unit configured to encode the frame images obtained by the blurring unit,
    a decode unit configured to decode the frame images encoded by the first encode unit,
    a differentiation unit configured to obtain difference images between corresponding frame images among the frame images decoded by the decode unit and the frame images input by the input unit,
    a second encode unit configured to encode the difference images, and
    a stream generation unit configured to generate the stream containing an encoding result of the first encode unit and an encoding result of the second encode unit;
  a first decode step of decoding the encoding result of the first encode unit contained in the stream;
  a second decode step of decoding the encoding result of the second encode unit contained in the stream;
  a step of acquiring an instruction indicating which of a motion blur-removed image and a multiple outline-removed image is to be output;
  a step of, in a case where the instruction indicates that the motion blur-removed image is to be output, generate the motion blur-removed image by compositing a decoding result of the first decode step and a decoding result of the second decode step, thereby outputting the generated motion blur-removed image; and
  a step of, in a case where the instruction indicates that the multiple outline-removed image is to be output, outputting the decoding result of the first decode step.

7. A non-transitory computer-readable storage medium storing a computer program for causing a computer to function as each unit of an image processing apparatus defined in claim 1.

8. The apparatus according to claim 4, wherein the instruction acquisition unit acquires the instruction which is inputted based on a user operation and indicates which of a motion blur-removed image and a multiple outline-removed image is to be output.

9. The method according to claim 6, wherein, in the step of acquiring the instruction, the instruction is acquired which is inputted based on a user operation and indicates which of a motion blur-removed image and a multiple outline-removed image is to be output.

* * * * *